United States Patent [19]

Beard

[11] Patent Number: 5,340,382
[45] Date of Patent: Aug. 23, 1994

[54] ACID GAS ABSORPTION PROCESS

[76] Inventor: Thomas L. Beard, P.O. Box 60306, Midland, Tex. 79711

[21] Appl. No.: 88,890

[22] Filed: Jul. 8, 1993

[51] Int. Cl.$^5$ .................... B01D 47/00; B01D 53/14
[52] U.S. Cl. ...................... 95/151; 95/219; 95/235; 95/236; 55/224; 55/237
[58] Field of Search ............... 95/151, 216, 219, 221, 95/222, 235, 236; 55/224, 235, 237, 238; 423/220, 242.1, 243.01

[56] References Cited

U.S. PATENT DOCUMENTS

| | | | |
|---|---|---|---|
| 3,248,860 | 5/1966 | Carlson | 55/238 |
| 3,593,496 | 7/1971 | Merrill | 55/77 |
| 3,690,040 | 9/1972 | Halfon | 95/236 X |
| 3,722,179 | 3/1973 | Moen et al. | 95/236 X |
| 3,899,099 | 8/1975 | Oiestad | 423/243.01 X |
| 3,929,434 | 12/1975 | Nelson | 95/235 X |
| 4,085,194 | 4/1978 | Otani et al. | 423/243.01 X |
| 4,098,582 | 7/1978 | Takeda | 55/235 X |
| 4,123,355 | 10/1978 | Poradek et al. | 95/235 X |
| 4,235,607 | 11/1980 | Kinder et al. | 95/236 X |
| 4,239,510 | 12/1980 | Hays et al. | 95/236 X |
| 4,272,499 | 6/1981 | Cason et al. | 95/219 X |
| 4,299,652 | 11/1981 | Masuno et al. | 95/235 X |
| 4,322,227 | 3/1982 | Cook et al. | 95/236 X |
| 4,844,162 | 7/1989 | Maassen et al. | 95/235 X |

FOREIGN PATENT DOCUMENTS

| | | | |
|---|---|---|---|
| 25606 | 5/1990 | Australia | 95/235 |
| 132537 | 10/1978 | Fed. Rep. of Germany | 95/235 |
| 3417546 | 10/1985 | Fed. Rep. of Germany | 95/236 |
| 49-053565 | 5/1974 | Japan | 95/235 |
| 55-073326 | 6/1980 | Japan | 95/235 |
| 01-094916 | 4/1989 | Japan | 95/236 |
| 02-080316 | 3/1990 | Japan | 95/236 |
| 955991 | 9/1982 | U.S.S.R. | 95/235 |
| 263830 | 11/1927 | United Kingdom | 95/235 |
| 960620 | 6/1964 | United Kingdom | 95/235 |
| 2105607 | 3/1983 | United Kingdom | 95/211 |

OTHER PUBLICATIONS

Paul Ragsdale "South-Tex Treaters, Inc" Circa Jul. 24, 1992, 4 pages Handwritten.
Thomas Beard "Beard Engineering, Inc" Letter to Yates Petroleum Corp. Attn. Paul Ragsdale, Aug. 4, 1992, 6 pages.
Koch Engineering Company Inc "Static Mixing Technology" ©1991 Koch E. C. Inc. Bulletin KSM-6 p. 3.

Primary Examiner—Robert Spitzer
Attorney, Agent, or Firm—Wendell Coffee

[57] ABSTRACT

Acid gas (a mixture of carbon dioxide and hydrogen sulfide) is absorbed by produced water from hydrocarbon wells. The acid gas is absorbed in the produced water in a static mixer. The time from the entry of the produced water into the static mixer to its exit is less than ten seconds. The produced water with the absorbed acid gas is pressurized to flow through a pipeline to an injection pump. The injection pump injects the produced water with the absorbed acid gas into injection wells which return the produced water into disposal strata. The produced water with the acid gas is maintained at a pressure higher than the pressure at the exit of the static mixer.

16 Claims, 1 Drawing Sheet

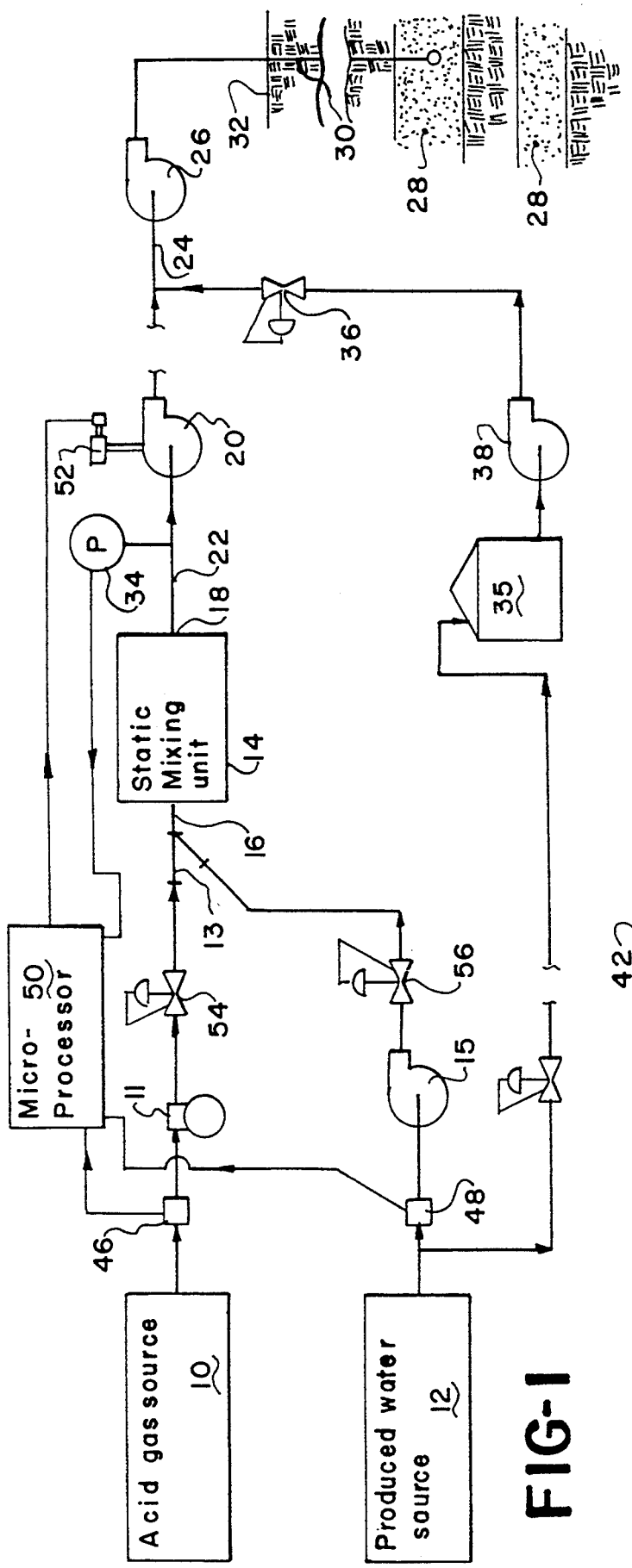

ACID GAS ABSORPTION PROCESS

CROSS REFERENCE TO RELATED APPLICATION

None, however, Applicant filed Disclosure Document Number 325,421 on Feb. 22, 1993, which document concerns this application; therefore, by separate paper it is respectfully requested that the document be retained and acknowledgment thereof made by the Examiner. (MoPEP 1706)

BACKGROUND OF THE INVENTION (1) Field of the Invention

This invention relates to the disposal of acid gas produced from hydrocarbon wells, such as oil wells. Oil field engineers have ordinary skill in this art.

(2) Description of the Related Art

A problem exists in the oil field when producing hydrocarbons from strata deep within the earth. These hydrocarbons(in gas and liquid form) often contain carbon dioxide and hydrogen sulfide. As used in this application, these gases are referred to as "acid gas". The acid gas is detrimental to the hydrocarbon usage, and therefore it is desired to remove it from the produced fluid. Processes for removing it are well known.

The hydrocarbon wells will often produce water as well. The produced water also is undesirable and is separated out. The water produced with the hydrocarbons from a strata deep below the surface of the earth is not pure water. The produced water is contaminated with different dissolved and suspended matter. In most cases, the produced water is also considered a pollutant and it is undesirable that it should be released on the surface of the earth where it would pollute surface streams or underground aquifers. One method of disposing of the produced water is to inject it into a productive or non-productive porous underground formation not containing potable water. Such an underground formation hereafter is called "disposal strata".

The separated acid gas often has insufficient value to justify further treatment or purification for any further usage. Treatment is often performed to reduce pollution. Acid gas is considered to be a pollutant and the discharge of acid gas into the atmosphere is undesirable, inasmuch as it results in "acid rain".

It is not an environmental pollution to inject the produced water with absorbed acid gases into disposal strata. In fact, the terminology of "productive or non-productive porous formation" is found in the government regulations concerning the disposal of produced water.

To inject fluids into a disposal strata, often takes high pressures. Although some injection wells extending into disposal strata might achieve satisfactory injection with no more than 400 psi, it is more common that injection pressures of 1500 psi–3000 psi are required.

Prior to this invention, at least two plants or installations which absorb acid gas into water for disposal previously exist. Both of these installations use fresh water at least partially. Each of these installations use an absorption tower. Absorption towers are basically bubble towers where the gas is bubbled through water in a series of trays. I.e. , the tower would contain several trays, each tray having several bubble caps for the bubbling of the gas through the water.

Neither of these prior plants operated completely on produced water. Fresh water absorbs more acid gas than the produced water. The fresh water used by these installations is from aquifers and is potable and suitable for domestic and agricultural use such as irrigation of crops. Produced water is suitable for neither drinking nor agricultural irrigation.

Fresh water, in many oil fields, is a scarce commodity and in any event, there are more productive uses for fresh water such as agricultural irrigation.

SUMMARY OF THE INVENTION (1) Progressive Contribution to the Art

According to this invention the acid gas is absorbed directly into produced water without substantial use of fresh water. It will be understood that the practice of this invention requires a certain quantity of produced water, which in most oil fields is available. However, if there is insufficient produced water, a supplement of fresh water would be necessary to practice the invention. The water used will be chiefly or primarily produced water.

Instead of absorbing the gas in the water by use of an absorption tower, the gas is thoroughly mixed with the water in a static mixer.

Static mixers are described by a manufacturer as an in-line mixer with no moving parts. It is a simple, cost-effective solution for mixing and contacting problems. It consists of a series of stationary, rigid elements placed lengthwise in a pipe. These elements form intersecting channels that split, rearrange, and recombine component streams into smaller and smaller layers until one homogeneous stream exists.

A Koch static mixer having 11 elements identified as 6" SMV-LY is satisfactory for a plant using approximately 10,000 Barrels (Bbl.) (42 gallons) of water a day.

After the gas is absorbed in the static mixer it is normally necessary to maintain the pressure upon the produced water with the absorbed acid gas therein to a pressure at least as great as the pressure within the static mixer. As a matter of design it is pressurized and maintained at least 10 psi higher than the static mixer pressure.

(2) Objects of this Invention

An object of this invention is to dispose of acid gas and produced water.

Another object of this invention is to avoid any atmospheric pollution and pollution of aquifers having potable water.

Yet another object is to conserve fresh water.

Further objects are to achieve the above with devices that are sturdy, compact, durable, lightweight, simple, safe, efficient, versatile, ecologically compatible, energy conserving, and reliable, yet inexpensive and easy to manufacture, install, operate, and maintain.

Other objects are to achieve the above with a method that is rapid, versatile, ecologically compatible, energy conserving, efficient, and inexpensive, and does not require highly skilled people to install, operate, and maintain.

The specific nature of the invention, as well as other objects, uses, and advantages thereof, will clearly appear from the following description and from the accompanying drawing.

BRIEF DESCRIPTION OF THE DRAWING

FIG. 1 of the drawing is a schematic representation of an embodiment of this invention.

FIG. 2 is a schematic representation of an embodiment of the static mixing unit.

As an aid to correlating the terms of the claims to the exemplary drawing, the following catalog of elements and steps is provided:

10 acid gas source
11 compressor
12 water source
13 "Y"
14 static mixing unit
15 water pump
16 inlet
18 exit
20 booster pump
22 conduit
24 pipeline
26 injection pump
28 strata
30 injection well
32 surface of earth
34 pressure gauge
35 tank
36 regulator valve
38 make up pump
40 mixer
42 valve
44 branch
46 gas meter
48 water meter
50 micro-processor
52 variable speed motor
54 gas pressure regulator
56 water pressure regulator
74 header
76 branch
78 valve
80 mixer

DESCRIPTION OF THE PREFERRED EMBODIMENT

Referring to FIG. 1, there may be seen a schematic representation of the invention. An acid gas source 10 is available. Normally, the acid gas would be under pressure less than 20 pounds per square inch gauge(hereafter psig). Likewise, there is a produced water source 12 also under less than 20 psig.

Gas is compressed by compressor 11 and fed to one inlet leg of "Y" 13. The gas would be fed at a pressure of at least about 20 psig. Produced water from source 12 would be pumped by pump 15 into another inlet leg of "Y" 13. The water would be at the same pressure as the gas from the compressor.

These two fluids are fed through the "Y" 13 to static mixing unit 14 at its inlet 16. The flow through the mixing would be for a very short time. The dwell time in the mixing would be less than about 10 seconds. The acid gas will be absorbed in the produced gas between the time the produced water and gas enter the static mixer and the produced water with the acid gas absorbed therein leave by exit 18.

From the exit, the produced water with the acid gas absorbed therein is immediately fed through conduit 22 to booster pump 20. Although the pump 20 is schematically illustrated as a radial flow or centrifugal pump, it is preferred that a horizontal split case centrifugal pump (axial flow) be used. It is desired that effort be used to prevent the gas from breaking out of the liquid. Therefore 90° elbows and short turns at the pump are avoided after the gas is absorbed in the produced liquid.

The produced water with the gas absorbed therein flows through pipeline 24 to injection pump 26. From the injection pump the produced water with the acid gases absorbed therein is injected into one of disposal strata 28. All of the strata 28 will be far below the surface of the earth 32. As may be seen in the drawing, the pipeline 24 is shown broken, inasmuch as this may represent a considerable distance, perhaps well over 5,000 feet. Also injection well 30 is shown broken, inasmuch as the depth of the well might well be over 5,000 feet.

Inasmuch as the injection of fluid into disposal strata far below the surface of the earth is well known to those having ordinary skill in this art, it is not further described here except to note that the pressure at the outlet of injection pump will usually be over 1500 psi.

It is highly desirable, if not absolutely necessary, that the pressure of the produced water with the absorbed gas, never be reduced to less than the pressure wherein the gas separates or "breaks out" from the produced water. This break out pressure is called the "critical pressure." The pressure at the inlet of the booster pump 20 as determined by pressure gauge 34 will usually be considered the "critical pressure".

To prevent pressure from dropping below the critical pressure, there is provision for an additional flow of water into the pipeline at the inlet of the injection pump 26. Regulator valve 36 regulates the pressuwe at the inlet of the pump 26 by having a flow of additional water into the inlet of the injection pump 26 in the event the pressure falls below the critical pressure. In practice it is desirable that the pressure at the inlet of the pump 26 be 10 psi above the critical pressure.

Make up pump 38 has an inlet from some source of liquid. For simplicity in the drawing representing an embodiment, this is shown to be the source of produced water 12 temporarily stored in tank 35 near make up pump 38. In practice this source of liquid could be any source of liquid, preferably some type water.

Those with ordinary skill in the art will understand the pressure regulation devices necessary to accomplish the purpose to always maintain the inlet pressure of the injection pump greater than the inlet pressure of the booster pump 20.

It is desirable in static mixers used in static mixing unit 14 to have the fluids reside for about two to four seconds. Satisfactory elements for the static mixing unit are designated as SMV and SMVL elements as manufactured by KOCH Engineering Co., Inc., P.O. Box 8127, Wichita, Kans. 67208. In 6" to 12" pipe the use of 10–12 such elements works well. It has been found that when the flow of water through the static mixer is below a velocity wherein the residence time is over about 3.5 seconds, in such a mixer the gas is not as well absorbed into the water as at the optimum velocity when the water is retained about 2.6 seconds.

Also, it appears that if the velocity of the water through the static mixer is increased so that the residence time is less than about 2.2 seconds, problems of gas breaking out of the water are experienced.

It was found in the pilot plant described later, by doubling the number of elements in a mixer increases the operable range of the residence time in the mixers. In 3" pipe 22 elements per mixer is usual practice. I.e., with the twenty two 3" SMV-AY elements that the optimum flow rate was about from 1.7 feet per second to about 2.7 feet per second with a residence time close to 2.6 seconds. However, it appears that if forty four elements were used that the velocity range could be reduced to as low as about 1.2 feet per second with a residence time of about 10 seconds, or increased to about 3 feet per second with a residence time at about 4 seconds (2 seconds for each 22 elements).

An example of a design of a plant using 10,000 to 20,000 Bbl/day, more than one static mixer section of 10-12 elements are might be used in the static mixing unit. One embodiment of a design is shown in FIG. 2. There is seen two static mixers identified as mixer 40, and mixer 80. Each mixer 40 and 80 are constructed of 6" SMV-LY elements with 11 elements used. The flow to mixer 40 would be controlled by valve 42 which is connected between the mixer 40 and branch 44 leading from the "Y" 13 to the static mixing unit 14. The flow into the mixer 80 would be controlled by valve 78 in branch 76 leading from the "Y" 13. The branches 44 and 76 form header 74. Therefore if the flow of water was approximately 300 gallons per minute (the approximate equivalent of 10,000 Bbl/day), the valve 78 could be closed and the valve 42 opened so that the flow of water through mixer 40 would be in the desired range of about 2.6 seconds residence time.

If the flow of water was about 600 gallons per minute (about 20,000 Bbl/day), both the mixers 40 and 80 could be utilized by opening both valves 42 and 78.

Another way of controlling the flow would be to have storage facilities for the acid gas and water so that low water flows could always be avoided and the gas and water stored until the mixer could run for a limited period of time at an optimum flow rate.

The residence time of the water in the mixer is the critical concern of the flow through the static mixer. I.e., if there was plenty of water available but very little acid gas being produced at the time, any amount of gas less than the designed amounts could be used.

To provide the proper flow of water and acid gas to the static mixing unit 14, gas meter 46 is placed at the inlet of compressor 11 measuring the gas from acid gas source 10. Water meter 48 is placed at the inlet to water pump 15 measuring the water from produced water source 12. Microprocessor 50 receives its input from the meters 46, 48 and the pressure gauge 34. The booster pump 20 is driven by variable speed motor 52 thereby providing for a variable flow from the static mixing unit. I.e., to reduce the flow the booster motor speed could be decreased therefore producing more back pressure at the exit 18 of the static mixing unit. If a greater flow of water was desired the variable speed motor could be increased therefore reducing the back pressure at the exit 18 of the static mixing unit. By knowing the pressure of the gauge 34 and the temperature, the amount of water to absorb the gas is measured by meter 46 would be known and the flow adjusted until the meter 48 produced the desired flow. So it will be understood that if the flow of gas was greater, either the flow through the static mixing unit exceeded the stable conditions as described above, the flow could be decreased by that amount. Therefore it will be understood that pressure regulator valve 54 to regulate the outlet pressure from the compressor 11 and pressure regulator 56 to regulate the water pressure at the inlet of the "Y" 13 would be desirable controls. Those having ordinary skill in the art will understand the microprocessors necessary to achieve the controls within the parameters set out above.

Also, from a knowledge of the absorption characteristic of the produced water for acid gas, the microprocessor could calculate the "critical pressure". If the supply of produced water greatly exceeded the quantity required, the booster pump might be eliminated.

It is expected that the produced water from each oil field will have different acid gas absorption characteristics from the produced water from all other oil fields. Therefore the specific values and observations that follow are based upon a pilot plant which was operated at Yates Foster Ranch at the Dagger Draw Field located in Eddy County, N. Mex. This plant is located about 17 miles North-Northwest of Carlsbad, N. Mex.

The acid gas at the Pilot Plant normally was about 40% $CO_2$, and 60% $H_2S$, 1.5% hydrocarbons, and less than 0.2% $N_2$ on a mol basis.

According to this operation, a maximum of 1,000 standard cubic feet (hereinafter MSCF) of acid gas could be absorbed in 160 barrels of produced water (42 gallons per barrel) with the water at 84° F. and the static mixer at 20 psig.

However, if the pressure were increased to about 42 psig, 1 mscf of acid gas could be absorbed in 80 barrels of water at 84° F. On the other hand if the temperature of the water at 20 psig was reduced to 77° F., 1 mscf of acid gas could be absorbed in 150 barrels of water. On the other hand if the temperature was increased to about 91° F., 170 barrels of water would be required to absorb 1 mscf of acid gas. For good operation, normally there should be provisions to maintain at 5% to 10% excess water than the minimum required. Also as a safety factor the injection pump inlet pressure should be at least 10 psi above the critical pressure.

It will be understood that the specifications of this invention have been written for one having ordinary skill in the art. It will be understood that many devices have not been described in detail inasmuch as they would be well known to such a person and also many things have not been mentioned, such as emergency connections to a flare, or other emergency and safety devices that would normally be employed in the design of such equipment.

The embodiment shown and described above is only exemplary. I do not claim to have invented all the parts, elements or steps described. Various modifications can be made in the construction, material, arrangement, and operation, and still be within the scope of my invention.

The restrictive description and drawings of the specific examples above do not point out what an infringement of this patent would be, but are to enable one skilled in the art to make and use the invention. The limits of the invention and the bounds of the patent protection are measured by and defined in the following claims.

I claim as my invention:

1. The process of disposing of acid gas produced from hydrocarbon producing strata, said strata located far below the surface of the earth, including a) absorbing the gas in water, and after absorbing said gas b) pumping said water into a disposal strata, c) wherein the improved method of absorbing the gas into the water in combination with the limitations previously recited comprises: d) flowing the water and gas through a static mixer.

2. The process as defined in claim 1 further comprising: e) after absorbing the gas in the water maintaining the water at a pressure at least as great as a pressure that the gas in the water begins to break out.

3. The process as defined in claim 2 further comprising: f) increasing the pressure of the water after flowing the water through the static mixer.

4. The process as defined in claim 1 further comprising: e) flowing the water through the static mixer at a velocity whereby the water is in the static mixer less than 10 seconds.

5. The process as defined in claim 1 further comprising: e) the water is produced water.

6. The process as defined in claim 1 further comprising: e) flowing the water whereby the water is in the static mixer for about 2.6 seconds.

7. Structure for disposing of acid gas and produced water into disposal strata far below the surface of the earth comprising: a) a source of acid gas under pressure, b) a source of produced water under pressure, c) a static mixer having an inlet and an outlet, d) said source of acid gas and said source of water each fluidly connected to said static mixer inlet, e) an injection well extending into underground strata, and f) said static mixer outlet connected to said injection well by g) a pipeline.

8. The structure as defined in claim 7 further comprising: h) an injection pump between the pipeline and the injection well to increase the pressure of the produced water sufficient for injecting the produced water into said strata.

9. The structure as defined in claim 8 further comprising: i) pressure regulating means for causing the pressure at the inlet of the injection pump to always be at least as high as a pressure that the gas begins to separate from the water.

10. The structure as defined in claim 7 further comprising: h) a booster pump having an inlet and an outlet fluidly attached to the outlet of the static mixer, i) said pipeline fluidly attached to the outlet of the booster pump, j) an injection pump having an inlet and an outlet fluidly attached to the pipeline, and k) the outlet of the injection pump fluidly connected to the injection well.

11. The structure as defined in claim 10 further comprising: l) pressure regulating means for causing the pressure at the inlet of the injection pump to always be at least as high as the pressure at the inlet of the booster pump.

12. Structure for disposing of acid gas and produced water into strata far below the surface of the earth comprising: a) a source of acid gas under pressure, b) a source of produced water under pressure, c) said source of acid gas and said source of produced water connected to a "Y" connection, d) the "Y" connection connected to a header, e) at least two valves connected to the header, f) at least two static mixers one of the static mixers connected to each of the valves, g) each of the static mixers connected to an outlet header, h) said outlet header connected to a pipeline, and i) an injection well extending into underground disposal strata, j) said pipeline connected to said injection well.

13. The structure as defined in claim 12 further comprising: k) an injection pump having an inlet and an outlet between the pipeline and the injection well to increase the pressure of the water sufficient for injecting the water into said strata.

14. The structure as defined in claim 13 further comprising: l) pressure regulating means for causing the pressure at the inlet of the injection pump to always be at least as high as a pressure that the gas begins to separate from the water.

15. The structure as defined in claim 12 further comprising: k) a booster pump fluidly attached to the outlet header, l) said pipeline fluidly attached to an outlet of the booster pump, m) an injection pump fluidly attached to the pipeline, and n) an outlet of the injection pump fluidly connected to the injection well.

16. The structure as defined in claim 15 further comprising: o) pressure regulating means for causing the pressure at an inlet of the injection pump to always be at least as high as the pressure at an inlet of the booster pump.

* * * * *